(12) United States Patent
Johnson

(10) Patent No.: US 12,030,675 B2
(45) Date of Patent: Jul. 9, 2024

(54) IMPACT DRIVER SEPARATION DEVICE AND METHOD

(71) Applicant: REPRISE SPACE SOLUTIONS, LLC, Houston, TX (US)

(72) Inventor: Michael David Johnson, Houston, TX (US)

(73) Assignee: REPRISE SPACE SOLUTIONS, LLC, Houston, TX (US)

( * ) Notice: Subject to any disclaimer, the term of this patent is extended or adjusted under 35 U.S.C. 154(b) by 0 days.

(21) Appl. No.: 18/514,749

(22) Filed: Nov. 20, 2023

(65) Prior Publication Data

US 2024/0083601 A1  Mar. 14, 2024

Related U.S. Application Data

(63) Continuation-in-part of application No. 17/493,556, filed on Oct. 4, 2021, now abandoned.

(60) Provisional application No. 63/087,250, filed on Oct. 4, 2020.

(51) Int. Cl.
 *B64G 1/64* (2006.01)
(52) U.S. Cl.
 CPC .................. *B64G 1/645* (2013.01)
(58) Field of Classification Search
 CPC ........ B64G 1/645; B64G 1/641; B64G 1/643; Y10T 29/49815; B25B 23/105; B25B 15/06; B25B 21/02; B60S 5/00; B25J 11/005; B25J 15/0019; B23P 19/06
 See application file for complete search history.

(56) References Cited

U.S. PATENT DOCUMENTS

| | | | |
|---|---|---|---|
| 2,012,906 | A | 8/1935 | Etzkorn |
| 2,012,916 | A | 8/1935 | Pott |
| 4,919,216 | A | 4/1990 | Ikegami |
| 6,457,230 | B1 | 10/2002 | Jin |
| 6,598,584 | B2 | 7/2003 | Beck et al. |
| 6,598,684 | B2 | 7/2003 | Watanabe |
| 10,458,894 | B2 | 10/2019 | Eigner |
| 2010/0327505 | A1 | 12/2010 | Pratt |
| 2019/0184550 | A1* | 6/2019 | Nielsen-Cole ........ B29C 64/118 |

\* cited by examiner

*Primary Examiner* — Lee A Holly
(74) *Attorney, Agent, or Firm* — HULSEY P.C.

(57) ABSTRACT

An impact driver separation device for spacecraft and other vehicular separation mechanisms including a first element, second element, first connector, second connector, and impact actuator. The first element and the second element are joined by the first connector and the second connector. The impact actuator connects to the first connector or the second connector. In one example, the first connector is a bolt, and the second connector is a nut. In another example, the first connector is a nut, and the second connector is a bolt. When the impact actuator connects to the first connector, the impact actuator permits removal of the first connector from the second connector for separation of the first element and the second element. When the impact actuator connects to the second connector, the impact actuator permits removal of the second connector from the first connector for separation of the first element and the second element.

2 Claims, 8 Drawing Sheets

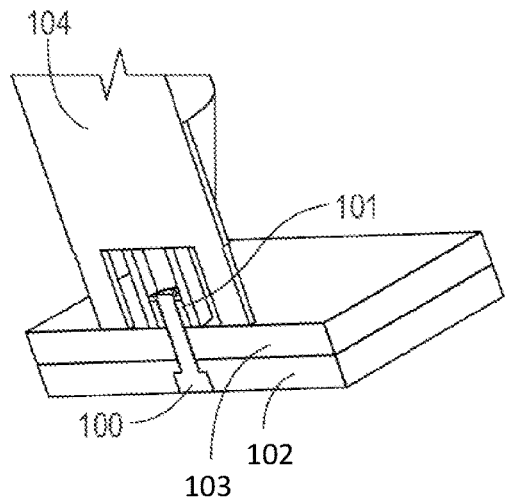
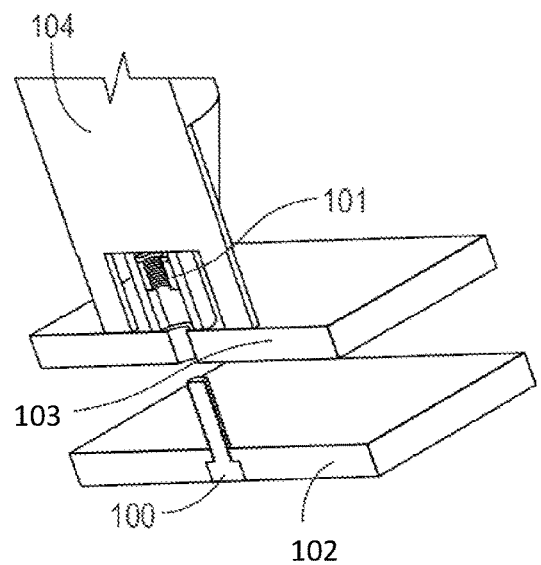
FIG. 1A    FIG. 1B
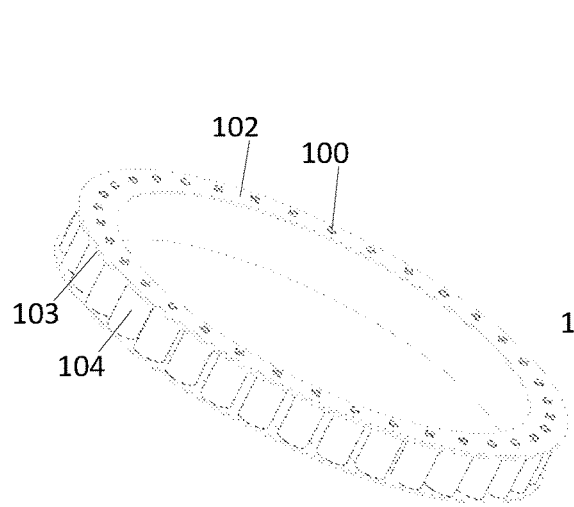
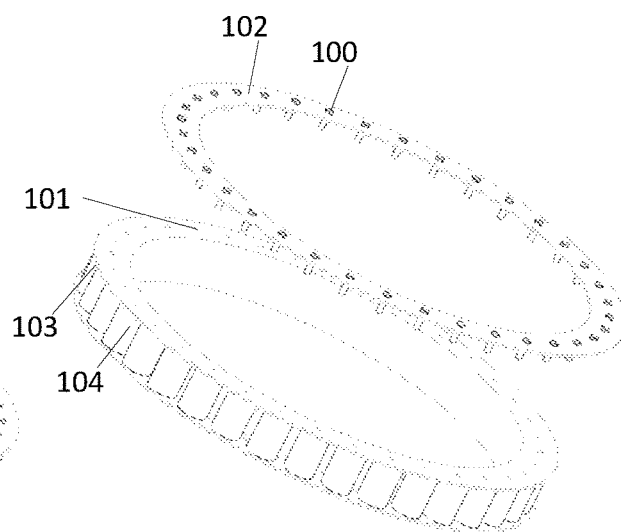
FIG. 1C    FIG. 1D

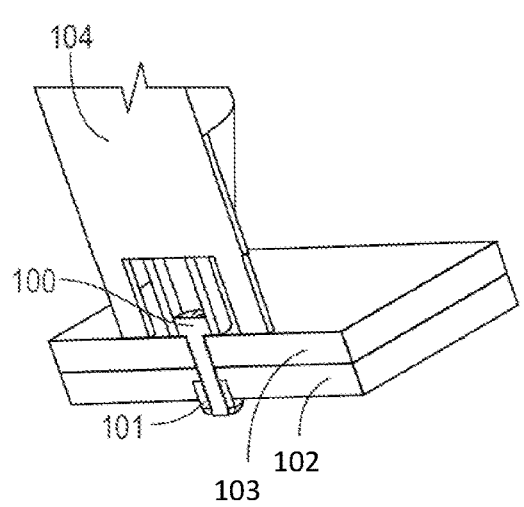
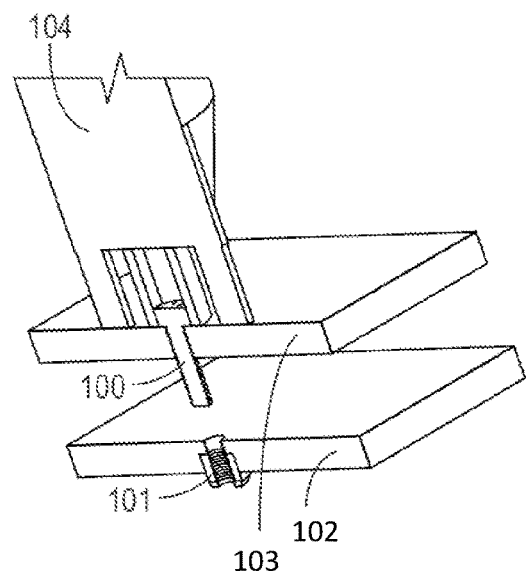
FIG. 2A      FIG. 2B
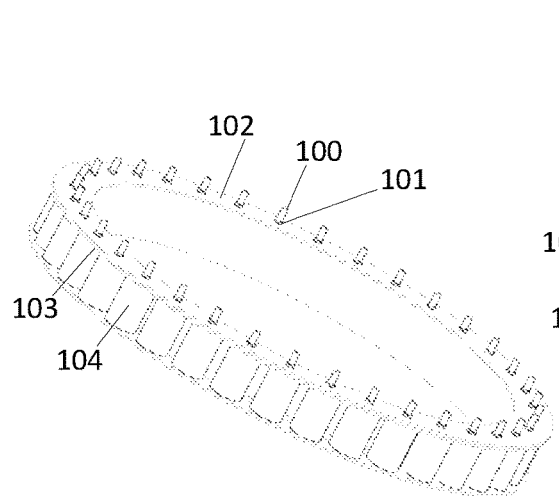
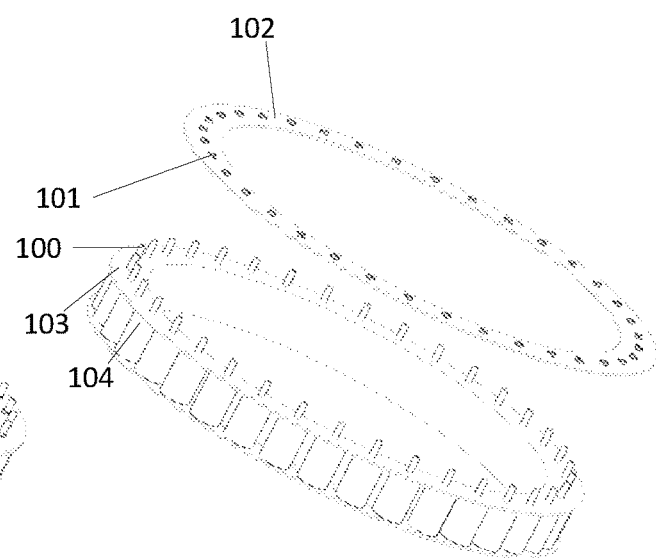
FIG. 2C      FIG. 2D

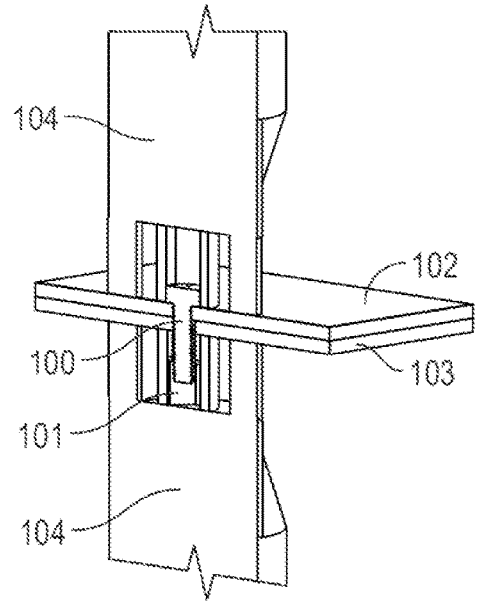 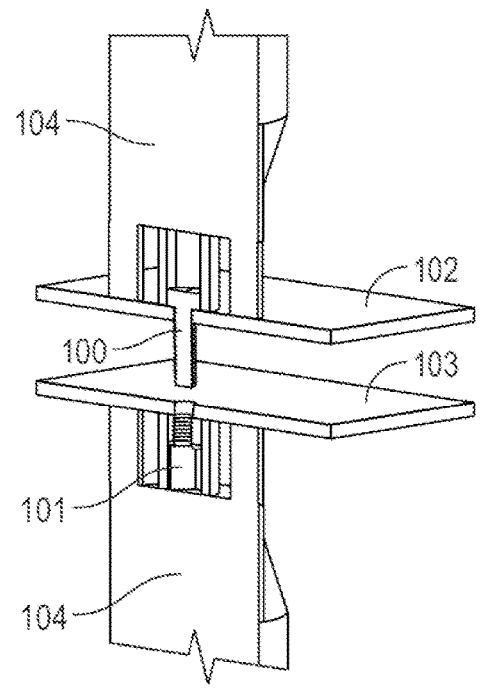
FIG. 3A  FIG. 3B
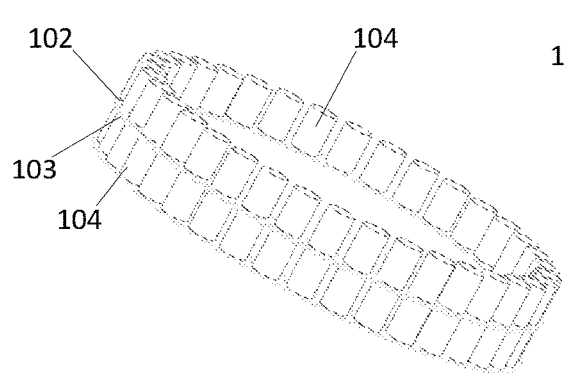 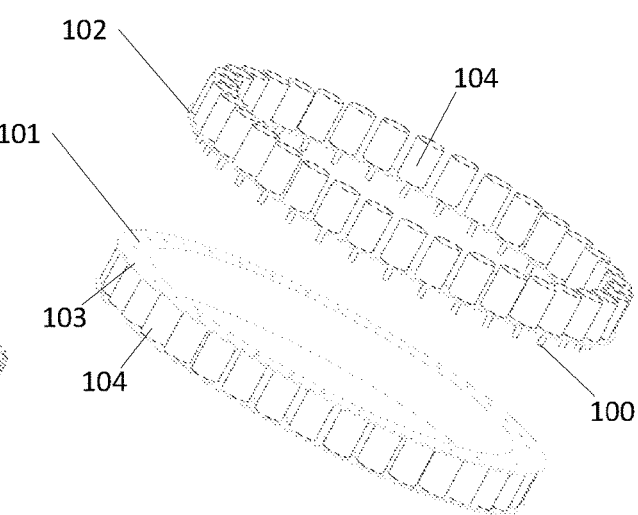
FIG. 3C  FIG. 3D

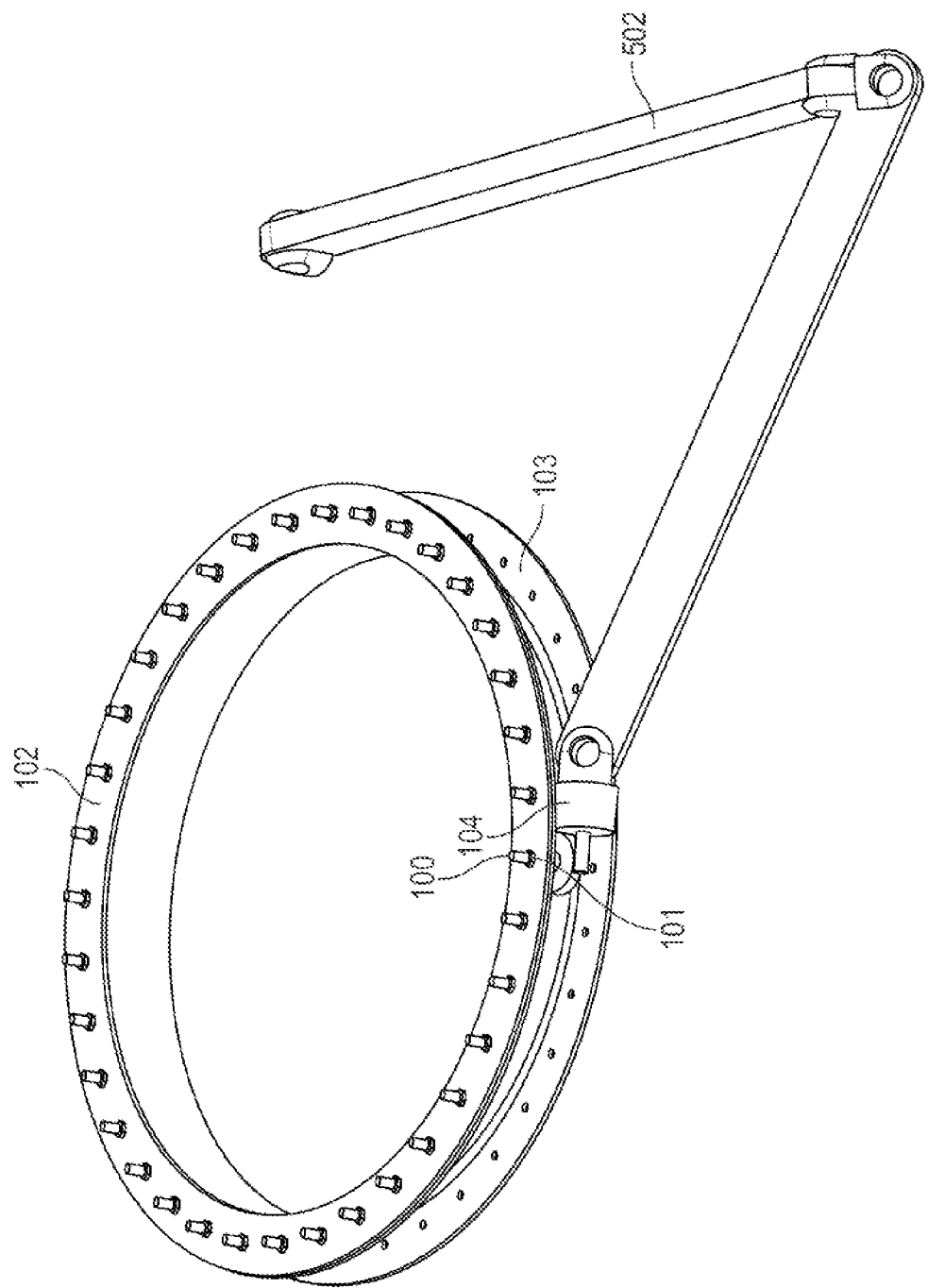

IMPACT DRIVER SEPARATION DEVICE AND METHOD

CROSS-REFERENCE TO RELATED APPLICATIONS

The present application is a continuation-in-part of U.S. application Ser. No. 17/493,556, filed Oct. 4, 2021; which claims the benefit of U.S. Provisional Application No. 63/087,250, filed on Oct. 4, 2020; all of which are incorporated herein in their entirety and referenced thereto.

FIELD OF INVENTION

The present invention relates generally to a payload separation system utilizing a traditional bolt and nut connective means for connecting a launch vehicle to a payload and a set of impact driver actuators to remove the nuts or bolts thus disconnecting the payload from the launch vehicle.

BACKGROUND

Underwater vehicles, aircraft, launch vehicles and spacecraft have long required specialized separation systems for various situations. For example, aircraft require separation systems for the release of bombs or fuel tanks, launch vehicles require separation systems for separating rocket stages or payloads and spacecraft require separation systems for releasing solar arrays or antennas amongst other things.

Many separation systems have been utilized over the years but have had a variety of shortcomings. The paradox of separation devices is that they "Must Hold" and "Must Release" at different times. For example, pyrotechnic bolts have been utilized but have the shortcoming of not being testable prior to utilization as well as generating large shock forces upon separation and debris generation. Non-pyrotechnic separation nuts have also been utilized but, since the restraining nut in the system is split, the holding strength of the nut is less than a traditional nut and bolt connection. Various other systems (e.g. TiNi Frangibolt, TiNi shape memory actuators, burn wires, etc.) have been utilized with some success but all suffer from relatively weak load capability when compared to a traditional bolt and nut connection.

Structural engineers consider a bolt and nut connection a pure structural element much like a riveted joint or a welded joint. A bolt and nut connection is well understood and considered the utmost in reliability if the proper bolt and nut are used for the connection as well as tensioned under the proper torque values. A bolt and nut connection is also capable of disconnection by simply unscrewing the nut from the bolt or vice versa.

Utilization of a bolt and nut connection would be highly desirable for all separation systems but standard removal of the bolt or nut to accomplish separation using traditional actuators (e.g. electric motors) has heretofore been impractical since the torque required to unscrew the bolt or nut would require an extremely large motor (e.g. electric, pneumatic or hydraulic) to overcome the starting torque of the bolt or nut.

Impact drivers were invented in the 1930's to provide compact sources of torque for bolt/nut removal, see U.S. Pat. No. 2,012,916 Pott. The advent of battery powered handheld electric power tools, see U.S. Pat. No. 6,598,684 Watanabe, has driven development of compact, low mass high torque impact drivers. For example, a brushless electric motor with a 160:1 gear ratio harmonic drive can provide on the order of 40 inch-lbs of torque. When an impact driver head with a brushless motor is utilized which is of the same volume and mass as the exemplar harmonic drive motor, an instantaneous torque of 1600 in-lbs is readily produced. This is 40 times the torque for the same mass and volume actuator and makes removal of highly tightened bolts and nuts possible with a handheld battery powered tool.

The disclosed subject matter helps to avoid these and other problems.

SUMMARY

The present invention relates generally to a payload separation system utilizing a traditional bolt and nut connective means for connecting a launch vehicle to a payload and a set of impact driver actuators to remove the nuts or bolts thus disconnecting the payload from the launch vehicle.

The inventive system utilizes a traditional bolt and nut combination as the primary structural element (the "Must Hold" state) to hold together a payload to a launch vehicle and a set of impact actuators to remove either the bolts or nuts to permit separation (the "Must Release" state) of the payload from the launch vehicle. The bolted joints can consist of one or more bolt and nut combinations (with washers, lock washers, locknuts, etc.)

Impact actuators are collocated with each bolt and nut combination and can apply torque to either the bolts or nuts to separate the payload from the launch vehicle.

Additionally, an impact actuator can be located on a form of trolley or robotic arm that can move the actuator to each bolt and nut location and can apply torque to either the bolt or nut to separate at least two elements.

Each impact actuator is preferably electrically actuated via a brushless motor capable of operating in a low or zero pressure atmospheric environment but can be of any motive power deemed convenient for the application (e.g. brushed electric motor, pneumatic motor, hydraulic motor, etc.).

The components driven by each impact actuator can be either a bolt (or screw which, the term "bolt" from here forward in this specification will mean either bolt or screw) or nut (or both bolt and nut) via a socket head, a driven bolt directly connected to the impact actuator, a nut via a socket head or a driven nut directly connected to each impact actuator.

The main advantage of using the invention is the provision of a novel means of utilizing multiple dedicated impact driver actuator mechanisms located at each nut and bolt connection that permits utilization of the full strength of each nut and bolt connection while permitting release of said nut and bolt connections at any desired time.

Utilization of the combination of a bolt and nut connections combined with impact actuators at each bolt and nut connection in a payload to launch vehicle separation system provides the following advantages: 1. The maximum strength of the bolted joint can be utilized, 2. The system may be tested for "Must Hold" and "Must Release" states any number of times, 3. Operational separation of "Must Hold" and "Must Release" state risk sources, 4. Utilization of the holding torque of the impact actuators to prevent backing off (i.e. loosening) of the nuts or bolts under any circumstances. 5. Automatic impact actuators motor over torque protection provided by the inherent impact actuators clutch action. 6. High holding strength density of the releasable assembly actuators (i.e. total impact actuator mass to total impact actuator volume ratio divided by the holding strength of the system).

Some applications of the separation system include submarine torpedo release mechanisms, submarine door release mechanisms, and underwater cable release mechanisms. Some aircraft applications are bomb release mechanisms, fuel tank release mechanisms, landing gear release mechanisms, and aircraft door release mechanisms. Some launch vehicle applications include rocket stage separation systems, payload separation systems and landing gear release mechanisms. Some spacecraft applications include solar array release mechanisms and antenna release mechanisms amongst other things.

BRIEF DESCRIPTION OF THE DRAWINGS

A more complete understanding of the invention and the many attendant advantages thereof will be readily appreciated as the same becomes better understood by reference to the following detailed description, when considered in connection with the accompanying drawings wherein:

FIG. 1A is a cutaway view of the first embodiment single impact actuator assembly detail while engaged.

FIG. 1B is a cutaway view of the first embodiment single impact actuator assembly detail while disengaged.

FIG. 1C is a view of the first embodiment multiple impact actuator payload separation assembly detail while engaged.

FIG. 1D is a view of the first embodiment multiple impact actuator payload separation assembly detail while disengaged.

FIG. 2A is a cutaway view of the second embodiment single impact actuator assembly detail while engaged.

FIG. 2B is a cutaway view of the second embodiment single impact actuator assembly detail while disengaged.

FIG. 2C is a view of the second embodiment multiple impact actuator payload separation assembly detail while engaged.

FIG. 2D is a view of the second embodiment multiple impact actuator payload separation assembly detail while disengaged.

FIG. 3A is a cutaway view of the third embodiment single impact actuator assembly detail while engaged.

FIG. 3B is a cutaway view of the third embodiment single impact actuator assembly detail while disengaged.

FIG. 3C is a view of the third embodiment multiple impact actuator payload separation assembly detail while engaged.

FIG. 3D is a view of the third embodiment multiple impact actuator payload separation assembly detail while disengaged.

FIG. 5B is a view of a seventh embodiment illustrating a single actuator on a robotic mechanism.

DESCRIPTION OF THE PREFERRED EMBODIMENT

Figure 4A:
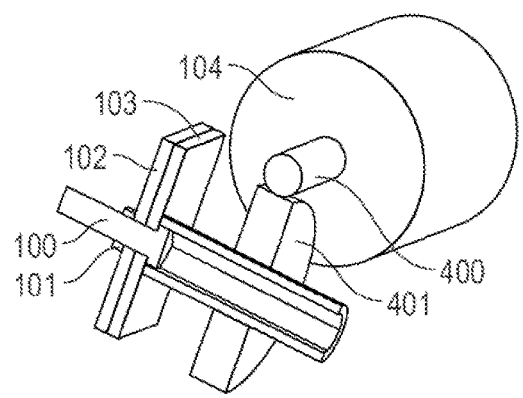
FIG. 4A is a cutaway view of the fourth embodiment single impact actuator assembly detail while engaged.

In FIG. 1A, a single element of the inventive device utilizes a traditional bolt 100 and nut 101 combination as the primary structural fastening element (the "Must Hold" state) to hold together at least two elements payload 102 side of the payload separation system and launch vehicle 103 side of the payload separation system and utilizes an impact actuator 104. It should be noted that impact actuator 104 is of the type disclosed in prior art in U.S. Pat. No. 2,012,916 Pott that utilizes a rotating hammer and anvil connected to some form of fastener interface, for example in this instance, such as a hex socket. The fastener interface could also be some form of bit, or any other form of fastener interface well known in the prior art, or the fastener could be directly connected to the anvil side of impact actuator 104.

In FIG. 1B, impact actuator 104 has applied sufficient starting torque and running torque to nut 101 to remove nut 101 from bolt 100 permitting separation (the "Must Release" state) of at least two elements payload 102 side of the payload separation system and launch vehicle 103 side of the payload separation system. The bolted joint of the separation system can consist of one or more bolt 100 and nut 101 combinations (and may include washers, lock washers, locknuts, etc. as desired). An impact actuator 104 is collocated and assigned with each bolt 100 and nut 101 sets.

In FIG. 1C, payload 102 side of the payload separation system and launch vehicle 103 side of the payload separation system are held together with traditional bolt 100 and nut 101 combinations. Dedicated and collocated impact actuators 104 are collocated with each bolt 100 and nut 101 pairs.

In FIG. 1D, impact actuators 104 have applied sufficient starting torque and running torque to nuts 101 to remove nuts 101 from bolts 100 permitting separation (the "Must Release" state) of at least two elements: payload 102 side of the payload separation system and launch vehicle 103 side of the payload separation system. Springs may be utilized to urge separation of payload 102 side of the payload separation system and launch vehicle 103 side of the payload separation system as is well known in the prior art.

In FIG. 2A, a single element of the inventive device utilizes a traditional bolt 100 and nut 101 combination as the primary structural fastening element (the "Must Hold" state) to hold together at least two elements payload 102 side of the payload separation system and launch vehicle 103 side of the payload separation system and utilizes an impact actuator 104. It should be noted that impact actuator 104 is of the type disclosed in prior art in U.S. Pat. No. 2,012,916 Pott that utilizes a rotating hammer and anvil connected to some form of fastener interface, for example in this instance, such as a hex socket. The fastener interface could also be some form of bit or any other form of fastener interface well known in the prior art or the fastener could be directly connected to the anvil side of impact actuator 104.

In FIG. 2B, impact actuator 104 has applied sufficient starting torque and running torque to bolt 100 to remove bolt 100 from nut 101 permitting separation (the "Must Release" state) of at least two elements payload 102 side of the payload separation system and launch vehicle 103 side of the payload separation system. The bolted joint of the separation system can consist of one or more bolt 100 and nut 101 combinations (and may include washers, lock washers, locknuts, etc. as desired). An impact actuator 104 is collocated and assigned with each bolt 100 and nut 101 sets.

In FIG. 2C, payload 102 side of the payload separation system and launch vehicle 103 side of the payload separation system are held together with traditional bolt 100 and nut 101 combinations. Dedicated and collocated impact actuators 104 are collocated with each bolt 100 and nut 101 pairs.

In FIG. 2D, impact actuators 104 have applied sufficient starting torque and running torque to bolts 100 to remove bolts 100 from nuts 101 permitting separation (the "Must Release" state) of at least two elements: payload 102 side of the payload separation system and launch vehicle 103 side of the payload separation system. Springs may be utilized to urge separation of payload 102 side of the payload separation system and launch vehicle 103 side of the payload separation system as is well known in the prior art.

In FIG. 3A, a single element of the inventive device utilizes a traditional bolt 100 and nut 101 combination as the primary structural fastening element (the "Must Hold" state) to hold together at least two elements payload 102 side of the payload separation system and launch vehicle 103 side of the payload separation system and utilizes two redundant impact actuators 104. It should be noted that redundant impact actuators 104 are of the type disclosed in prior art in U.S. Pat. No. 2,012,916 Pott that utilize a rotating hammer and anvil connected to some form of fastener interface, for example in this instance, such as a hex socket. The fastener interface could also be some form of bit, or any other form of fastener interface well known in the prior art or the fastener could be directly connected to the anvil side of impact actuators 104.

In FIG. 3B, redundant impact actuators 104 have applied sufficient starting torque and running torque to both bolt 100 and nut 101 to remove bolt 100 from nut 101 permitting separation (the "Must Release" state) of at least two elements payload 102 side of the payload separation system and launch vehicle 103 side of the payload separation system. The bolted joint of the separation system can consist of one or more bolt 100 and nut 101 combinations (and may include washers, lock washers, locknuts, etc. as desired). Two impact actuators 104 are collocated and assigned with each bolt 100 and nut 101 sets in a redundant fashion to ensure separation (the "Must Release" state) of at least two elements payload 102 side of the payload separation system and launch vehicle 103 side of the payload separation system. In this case impact actuators 104 are collocated and assigned and are redundant to each other so either or both can perform the separation action.

In FIG. 3C, payload 102 side of the payload separation system and launch vehicle 103 side of the payload separation system are held together with traditional bolt 100 and nut 101 combinations. Dedicated, collocated, and redundant impact actuators 104 are collocated with each bolt 100 and nut 101 pairs.

In FIG. 3D, redundant impact actuators 104 have redundantly applied sufficient starting torque and running torque to nuts 101 and bolts 100 to remove nuts 101 from bolts 100 permitting separation (the "Must Release" state) of at least two elements: payload 102 side of the payload separation system and launch vehicle 103 side of the payload separation system. Springs may be utilized to urge separation of payload 102 side of the payload separation system and launch vehicle 103 side of the payload separation system as is well known in the prior art.

In FIG. 4A, a single element of the inventive device utilizes a traditional bolt 100 and nut 101 combination as the primary structural fastening element (the "Must Hold" state) to hold together at least two elements payload 102 side of the payload separation system and launch vehicle 103 side of the payload separation system and utilizes an impact actuator 104 coupled to worm gear 400, which drives gear 401 that includes a socket shaped opening 402 that applies torque to bolt 100. This combination provides a right-angle drive functionality for use in spaces that would not be able to accommodate the volume of impact actuator 104. Worm gear 400 and driven gear 401 also provide an extremely large mechanical advantage that further multiplies the torque applied to bolt 100. It should be noted that impact actuator 104 is of the type disclosed in prior art in U.S. Pat. No. 2,012,916 Pott that utilizes a rotating hammer and anvil connected to some form of fastener interface, for example in this instance, such as a driven gear/hex socket combination 401. The fastener interface could also be some form of bit, or any other form of fastener interface well known in the prior art, or the fastener could be a threaded hole in driven gear 401.

Figure 4B:
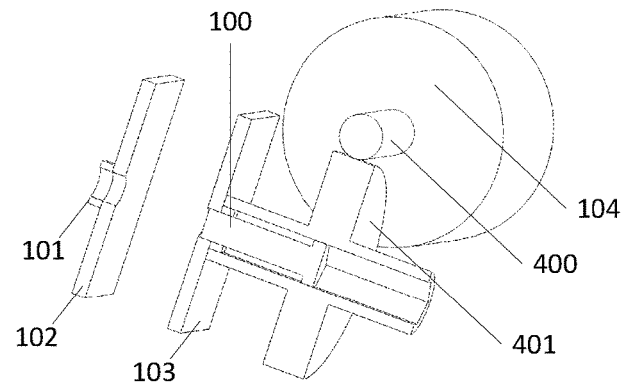
FIG. 4B is a cutaway view of the fourth embodiment single impact actuator assembly detail while engaged.

In FIG. 4B, a single element impact actuator 104 has applied sufficient starting torque and running torque through worm gear 400, driven gear 401 and socket opening 402 to nut 101 to remove nut 101 from bolt 100 permitting separation (the "Must Release" state) of at least two elements payload 102 side of the payload separation system and launch vehicle 103 side of the payload separation system. The bolted joint can consist of one or more bolt 100 and nut 101 combinations (with washers, lock washers, locknuts, etc.). An impact actuator 104 with worm gear 400, driven gear 401 and socket opening 402 is collocated with each bolt 100 and nut 101 sets. Of course, as in the previous examples, either bolt 100 or nut 101 or both bolt 100 and nut 101 can be driven by socket shaped opening 402 permitting separation (the "Must Release" state) of at least two elements payload 102 side of the payload separation system and launch vehicle 103 side of the payload separation system. In the present embodiment, bolt 100 acts as a first connector and nut 101 acts as a second connector.

Figure 4C:
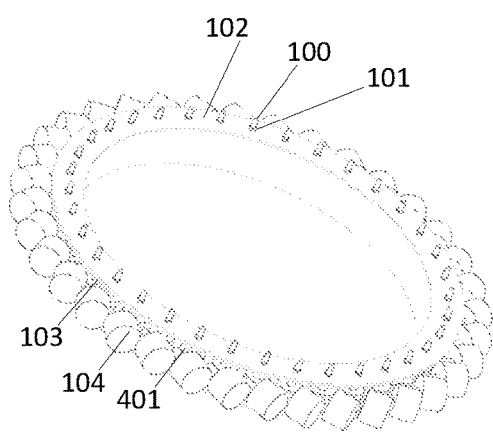
FIG. 4C is a view of the fourth embodiment multiple impact actuator payload separation assembly detail while engaged.

In FIG. 4C, payload 102 side of the payload separation system and launch vehicle 103 side of the payload separation system are held together with traditional bolt 100 and nut 101 combinations. Dedicated and collocated impact actuators 104 coupled to worm gears 400, which drives gears 401 that includes socket shaped openings 402 that applies torque to bolts 100. This combination provides a right-angle drive functionality for use in spaces that would not be able to accommodate the volume of impact actuators 104. Worm gears 400 and driven gears 401 also provide an extremely large mechanical advantage that further multiplies the torque applied to bolt 100 and are collocated with each bolt 100 and nut 101 pairs.

Figure 4D:
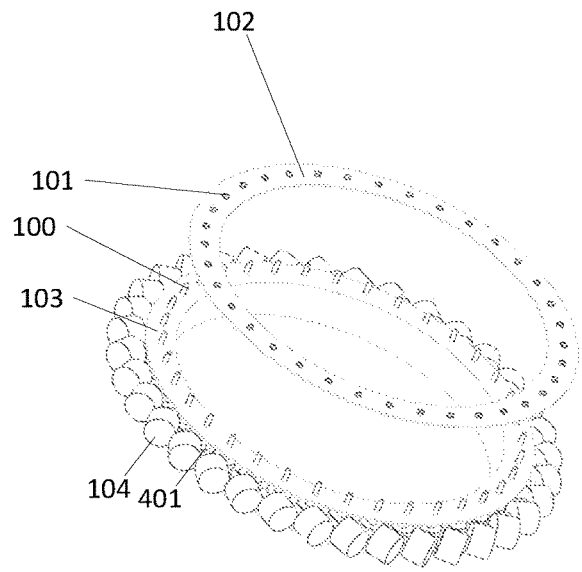
FIG. 4D is a view of the fourth embodiment multiple impact actuator payload separation assembly detail while disengaged.

In FIG. 4D, impact actuators 104 coupled to worm gears 400, which drives gears 401 that includes socket shaped openings 402 have applied sufficient starting torque and running torque to bolts 100 to remove bolts 100 from nuts 101 permitting separation (the "Must Release" state) of at least two elements: payload 102 side of the payload separation system and launch vehicle 103 side of the payload separation system. Springs may be utilized to urge separation of payload 102 side of the payload separation system and launch vehicle 103 side of the payload separation system as is well known in the prior art.

Figure 4E:
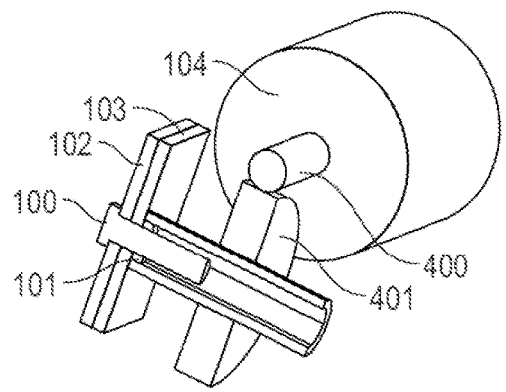
FIG. 4E is a cutaway view of the fifth embodiment single impact actuator assembly detail while engaged.

In FIG. 4E, a single element of the inventive device utilizes a traditional bolt 100 and nut 101 combination as the primary structural fastening element (the "Must Hold" state) to hold together at least two elements payload 102 side of the payload separation system and launch vehicle 103 side of the payload separation system and utilizes an impact actuator 104 coupled to worm gear 400, which drives gear 401 that includes a socket shaped opening 402 that applies torque to nut 101. This combination provides a right-angle drive functionality for use in spaces that would not be able to accommodate the volume of impact actuator 104. Worm gear 400 and driven gear 401 also provide an extremely large mechanical advantage that further multiplies the torque applied to nut 101. It should be noted that impact actuator 104 is of the type disclosed in prior art in U.S. Pat. No. 2,012,916 Pott that utilizes a rotating hammer and anvil connected to some form of fastener interface, for example in this instance, such as a driven gear/hex socket combination 401. The fastener interface could also be some form of bit, or any other form of fastener interface well known in the prior art or the fastener could be a threaded hole in driven gear 401.

Figure 4F:
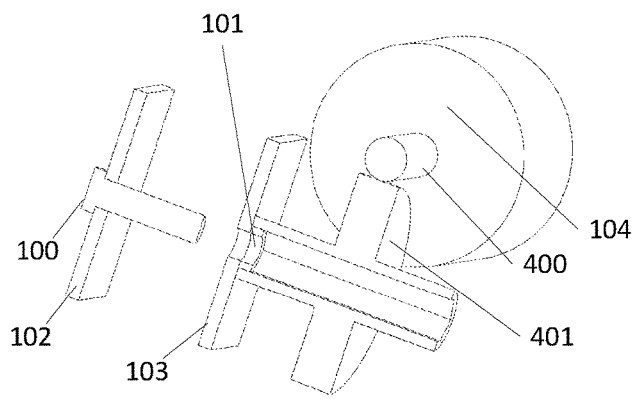
FIG. 4F is a cutaway view of the fifth embodiment single impact actuator assembly detail while disengaged.

In FIG. 4F, a single element impact actuator 104 has applied sufficient starting torque and running torque through worm gear 400, driven gear 401 and socket opening 402 to nut 101 to remove nut 101 from bolt 100 permitting separation (the "Must Release" state) of at least two elements payload 102 side of the payload separation system and launch vehicle 103 side of the payload separation system. The bolted joint can consist of one or more bolt 100 and nut 101 combinations (with washers, lock washers, locknuts, etc.). An impact actuator 104 with worm gear 400, driven gear 401 and socket opening 402 is collocated with each bolt 100 and nut 101 sets. Of course, as in the previous examples, either bolt 100 or nut 101 or both bolt 100 and nut 101 can be driven by socket shaped opening 402 permitting separation (the "Must Release" state) of at least two elements payload 102 side of the payload separation system and launch vehicle 103 side of the payload separation system. In the present embodiment, nut 101 acts as a first connector and bolt 100 acts as a second connector.

Figure 4G:
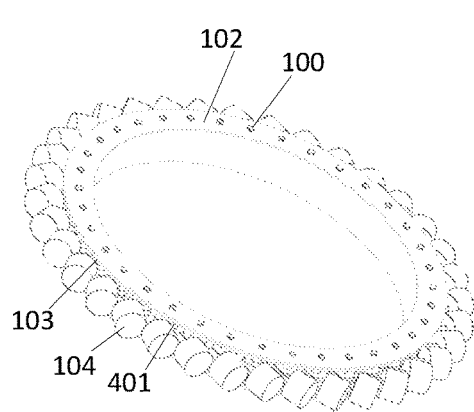
FIG. 4G is a view of the fifth embodiment multiple impact actuator payload separation assembly detail while engaged.

In FIG. 4G, payload 102 side of the payload separation system and launch vehicle 103 side of the payload separation system are held together with traditional bolt 100 and nut 101 combinations. Dedicated and collocated impact actuators 104 coupled to worm gears 400, which drives gears 401 that includes socket shaped openings 402 that applies torque to nuts 101. This combination provides a right-angle drive functionality for use in spaces that would not be able to accommodate the volume of impact actuators 104. Worm gears 400 and driven gears 401 also provide an extremely large mechanical advantage that further multiplies the torque applied to nuts 101 and are collocated with each bolt 100 and nut 101 pairs.

Figure 4H:
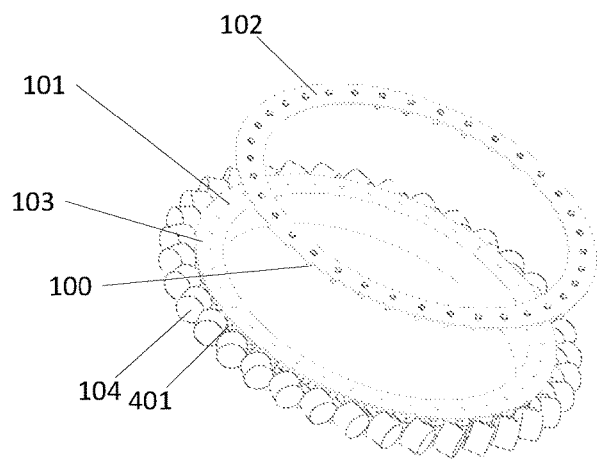
FIG. 4H is a view of the fifth embodiment multiple impact actuator payload separation assembly detail while disengaged.

In FIG. 4H, impact actuators 104 coupled to worm gears 400, which drives gears 401 that includes socket shaped openings 402 have applied sufficient starting torque and running torque to nuts 101 to remove nuts 101 from bolts 100 permitting separation (the "Must Release" state) of at least two elements: payload 102 side of the payload separation system and launch vehicle 103 side of the payload separation system. Springs may be utilized to urge separation of payload 102 side of the payload separation system and launch vehicle 103 side of the payload separation system as is well known in the prior art.

Figure 5A:
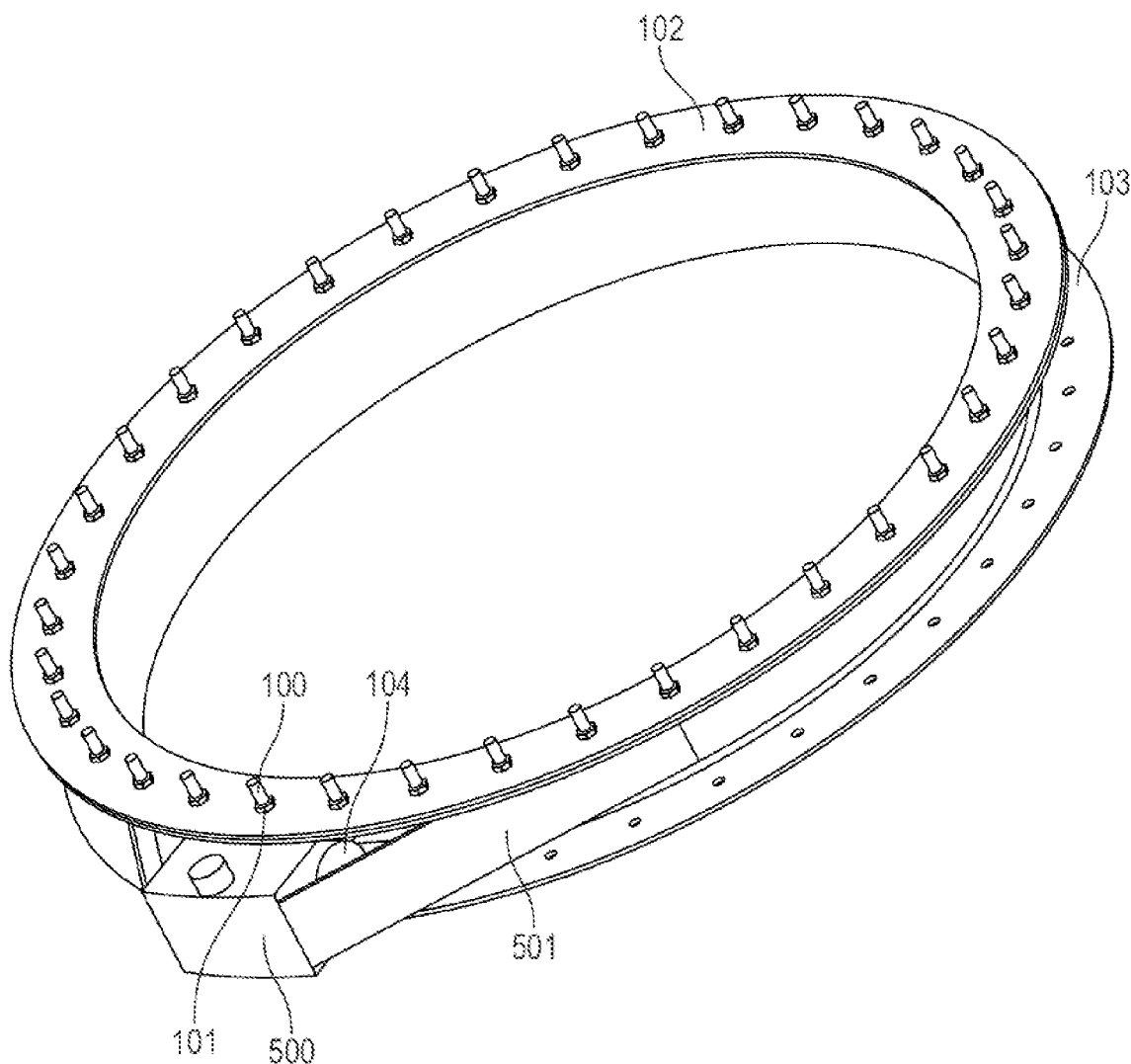
FIG. 5A is a view of a sixth embodiment illustrating a single actuator on a trolley mechanism.

In FIG. 5A, impact actuator 104 (in this illustration like the unit illustrated in FIGS. 4a and 4e) is located on a form of trolley 500 that can move actuator 104 to each bolt 100 and nut 101 location to apply torque to either the bolt 100 or nut 101 to separate at least two elements payload 102 side of the payload separation system and launch vehicle 103 side of the payload separation system. Trolley 500 can be moved around ring element launch vehicle 103 side of the payload separation system via a cogged belt 501 to access each bolt 100 head. In addition, trolley 500 can move impact actuator 104 in a perpendicular direction to engage and disengage impact actuator 104 from bolt 100 heads.

In FIG. 5B, impact actuator 104 is located on a robotic arm 502 that can move actuator 104 to each bolt 100 and nut 101 location to apply torque to either the bolt 100 or nut 101 to separate at least two elements payload 102 side of the payload separation system and launch vehicle 103 side of the payload separation system. Actuator 104 can be separable from robotic arm 502 to permit utilization of other tools and end effectors with robotic arm 502 as is well known in prior art. In the present embodiment, bolt 100 acts as a first connector and nut 101 acts as a second connector, or vice versa.

Figure 6:
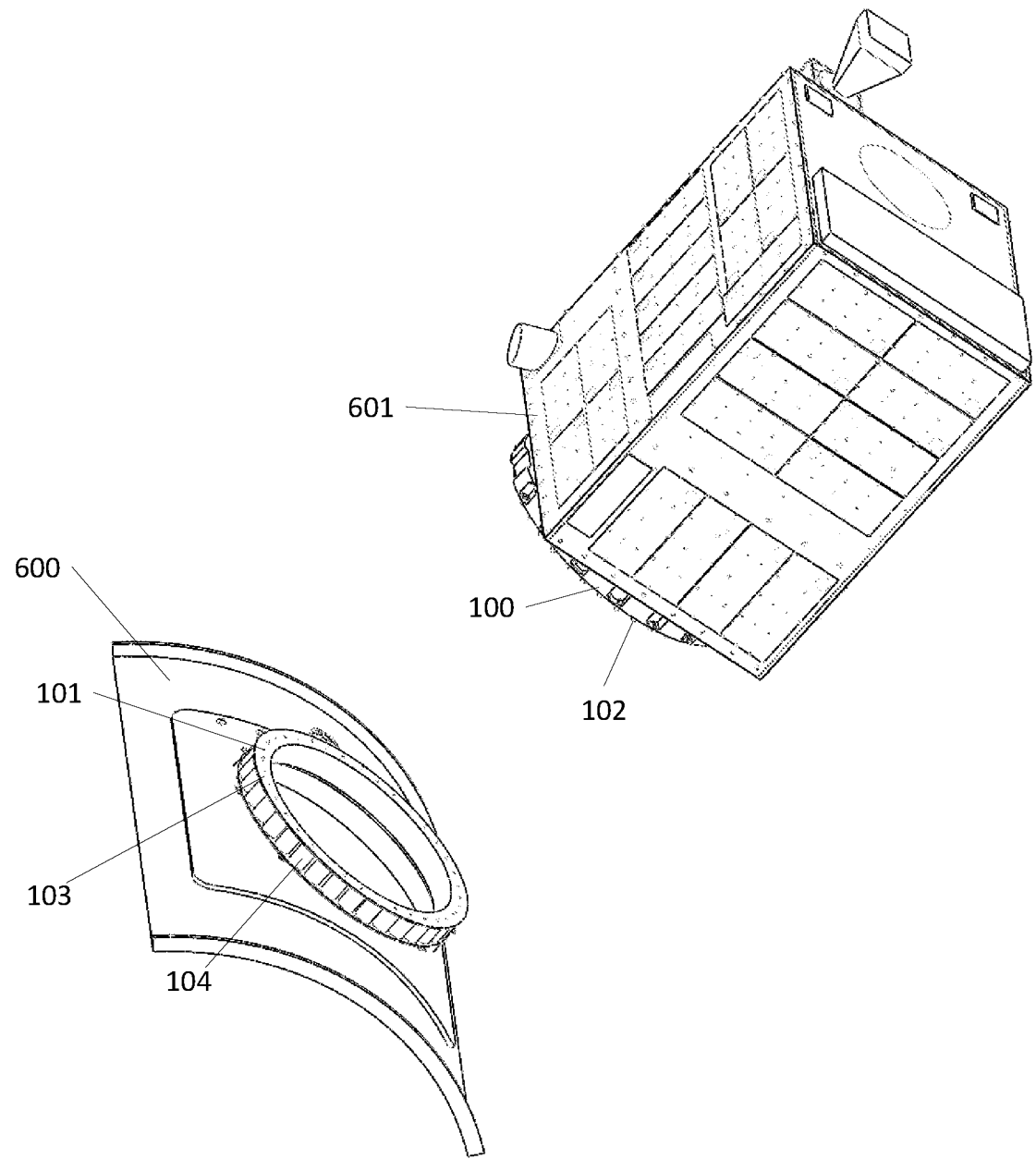
FIG. 6 is a view of the first embodiment illustrating deployment of a satellite from a launch vehicle utilizing the inventive device.

FIG. 6 illustrates the inventive device as configured in FIGS. 1A-1D deploying a satellite 601 from launch vehicle 600 where, impact actuators 104 have applied sufficient starting torque and running torque to nuts 101 to remove nuts 101 from bolts 100 permitting separation (the "Must Release" state) of at least two elements: payload 601 (e.g. a satellite) attached to payload 102 side of the payload separation system and launch vehicle 600 attached to launch vehicle 103 side of the payload separation system. Springs may be utilized to urge separation of payload 102 side of the payload separation system and launch vehicle 103 side of the payload separation system as is well known in the prior art.

Impact actuator 104 is preferably electrically actuated via a brushless motor capable of operating in a liquid, high pressure, low or zero pressure (vacuum) environment but can be of any motive power deemed convenient for the application (e.g., brushed electric motor, pneumatic motor, hydraulic motor, etc.). The motor may also consist of a redundant motor system (two or more motors connected in series or parallel) to provide increased reliability for the assured separation (the "Must Release" state) of at least two elements payload 102 side of the payload separation system and launch vehicle 103 side of the payload separation system. Additional operational redundancy may also occur if, for example, two impact actuators 104 are utilized with a trolley 500 or two impact actuators 104 are utilized with two robotic arms 501.

Operation of traditional impact actuator mechanisms 104, such as those described in U.S. Pat. No. 2,256,496 Robinson possesses a unique automatic driving motor over-torque protection function. In the event the torque required to release the driven element is above the direct shaft torque provided by the driving motor, a clutch mechanism permits the impact hammer to slide past the anvil at a torque value below the motor stalling torque, thus providing motor over-torque protection and preventing damage to the driving motor.

The inventive device permits the maximum strength of the bolted joint (bolt 100 and nut 101) to be utilized thus utilizing the minimum number of fasteners required to hold elements payload 102 side of the payload separation system and launch vehicle 103 side of the payload separation system together. This has the effect of minimizing the total mass required for the holding/release mechanism of the overall system.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A satellite deployment impact driver separation system, comprising:
   a first payload side element;
   a second launch vehicle side element;
   a first payload side bolt or nut;
   a second launch vehicle side nut or bolt; and
   a dedicated collocated impact actuator,
   wherein said first payload side element and said second launch vehicle side element are joined by said first payload side bolt or nut and said second launch vehicle side nut or bolt respectively,
   wherein said dedicated collocated impact actuator dedicatedly connects to said first payload side bolt or nut or said second launch vehicle side nut or bolt respectively,
   said dedicated collocated impact actuator permits removal of said first payload side bolt or nut from said second launch vehicle side nut or bolt respectively for separation of said first payload side element and said launch vehicle side second element.

2. A method of providing a satellite deployment impact driver separation system,
   said method comprising steps of:
      providing a first payload side element;
      providing a second launch vehicle side element;
      providing a first payload side bolt or nut;
      providing a second launch vehicle side nut or bolt;
      providing a dedicated collocated impact actuator;
   joining said first payload side element and said second launch vehicle side element by said first payload side bolt or nut and said second launch vehicle side nut or bolt respectively;
   connecting said dedicated collocated impact actuator to said first payload side bolt or nut or said second launch vehicle side nut or bolt respectively; and
   when said dedicated collocated impact actuator connects to said first payload side bolt or nut, permitting removal of said first payload side bolt or nut from said second launch vehicle side nut or bolt respectively by said dedicated collocated impact actuator for separation of said first payload side element and said second launch vehicle side element; or
   when said dedicated collocated impact actuator connects to said second launch vehicle side nut or bolt, permitting removal of said second launch vehicle side nut or bolt from said first payload side bolt or nut respectively by said dedicated collocated impact actuator for separation of said payload side first element and said second launch vehicle side element.

* * * * *